United States Patent
Paschke et al.

(10) Patent No.: US 9,208,001 B2
(45) Date of Patent: Dec. 8, 2015

(54) OBJECT MEDIATED DATA TRANSFER BETWEEN ELECTRONIC DEVICES

(75) Inventors: Brian Dennis Paschke, Toronto (CA); Aaron Michael Szymanski, Mississauga (CA)

(73) Assignee: BlackBerry Limited, Waterloo, CA (US)

(*) Notice: Subject to any disclaimer, the term of this patent is extended or adjusted under 35 U.S.C. 154(b) by 312 days.

(21) Appl. No.: 13/415,119

(22) Filed: Mar. 8, 2012

(65) Prior Publication Data
US 2013/0238744 A1    Sep. 12, 2013

(51) Int. Cl.
*G06F 15/167* (2006.01)
*G06F 9/54* (2006.01)

(52) U.S. Cl.
CPC ................................. *G06F 9/543* (2013.01)

(58) Field of Classification Search
USPC .......................................... 709/216, 200, 219
IPC ..................................................... H04I 49/9078
See application file for complete search history.

(56) References Cited

U.S. PATENT DOCUMENTS

| | | | | |
|---|---|---|---|---|
| 8,407,186 B1* | 3/2013 | Cremelie et al. | ............... | 707/664 |
| 2008/0178103 A1* | 7/2008 | Campbell | ............... | 715/764 |
| 2008/0282180 A1* | 11/2008 | Glasgow et al. | ............... | 715/770 |
| 2010/0241817 A1 | 9/2010 | Oogai | | |
| 2013/0073854 A1* | 3/2013 | Patti et al. | ............... | 713/171 |

OTHER PUBLICATIONS

European Search Report dated Aug. 8, 2012 from corresponding EP application 12158655.6.
CANADIAN INTELLECTUAL PROPERTY OFFICE, Office Action on Application No. 2,808,642, Issued on Jul. 28, 2015.

* cited by examiner

*Primary Examiner* — El Hadji Sall
(74) *Attorney, Agent, or Firm* — Moffat & Co.

(57) ABSTRACT

Systems, devices and methods for transferring data between two or more different electronic devices are described further herein. The data transfer is mediated by an object, such as a stylus, having a unique identifier. The same object is used when copying the data from a first electronic device and when pasting the data at a second electronic device.

20 Claims, 17 Drawing Sheets

OBJECT MEDIATED DATA TRANSFER BETWEEN ELECTRONIC DEVICES

TECHNICAL FIELD

The current description relates generally to the transfer of data between electronic devices, and in particular to mediating data transfer with an object having a unique identifier.

BACKGROUND

With all of the different electronic devices available to a user, it can be difficult to provide a convenient mechanism for transferring or copying data between the electronic devices. One way for sharing data between electronic devices is to e-mail a copy of the data from a first electronic device and to receive the e-mail on a second electronic device. Although e-mailing of data allows data to be shared between devices that are capable of receiving e-mail, it may be cumbersome requiring a number of actions to initiate the transfer and complete the transfer. For example a user needs to login to an e-mail system to both send and receive the data, include the data in the e-mail, identify a recipient and incorporate the data into a desired application on the recipient device.

Data transfer between electronic devices may also be done through a shared network storage location allowing data to be transferred from a first electronic device to the network location and then transferred from the network location to a second electronic device. The network location may act as a network based clipboard for the user enabling transfer between devices however while this approach provides functionality similar to copying data from one device and pasting it on another device, a number of steps are required by the user to initiate and complete the transfer. Alternatively transferring data between two local devices can be performed by a direct or bridge type connection, however a number of steps are required to identify the connection and implement the transfer of data and the devices must be within proximity of each other.

It is desirable to have an improved system and method of transferring data between electronic devices that overcomes or mitigates the drawbacks above.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
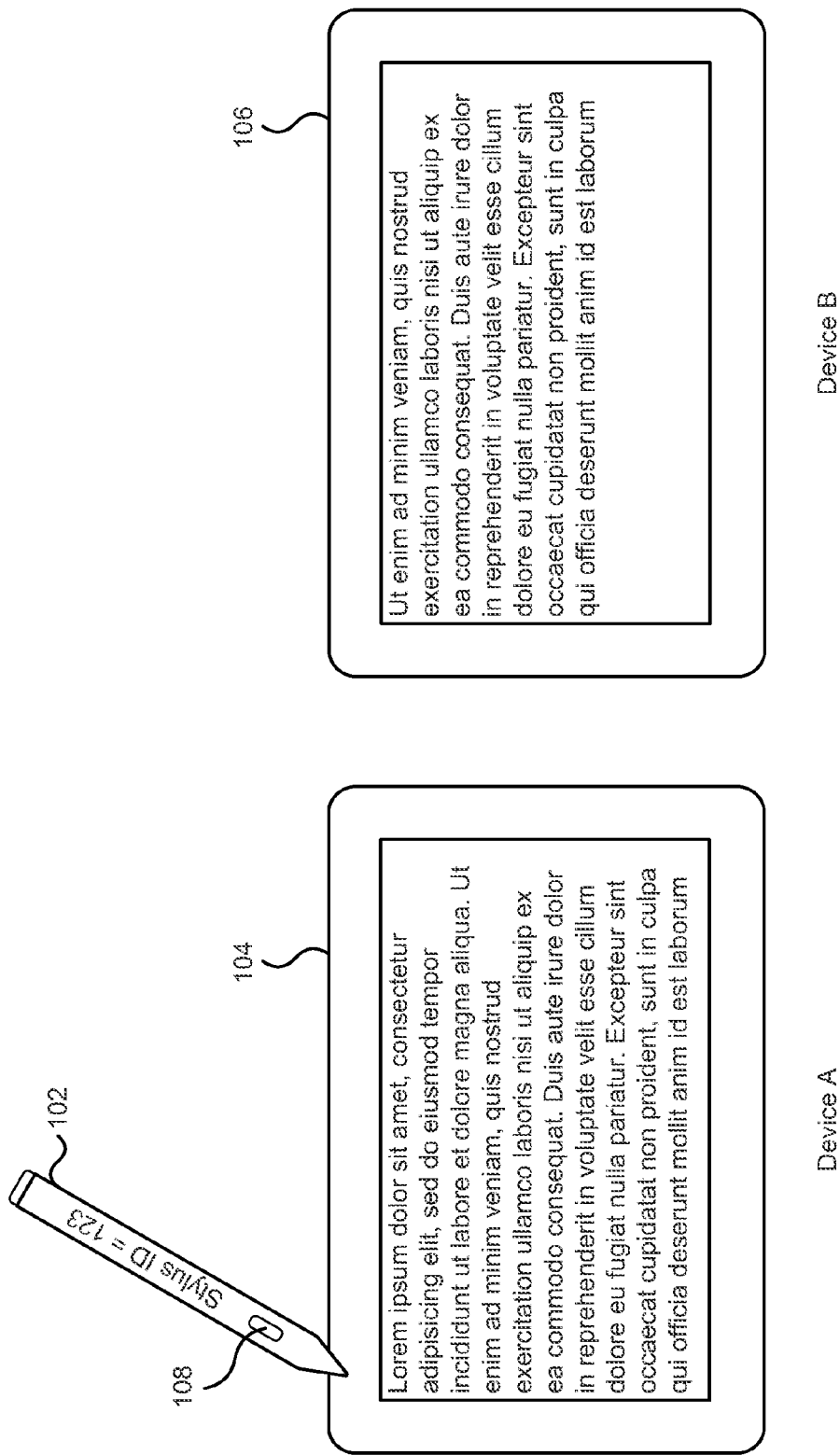
FIGS. 1 to 8 depict operations for copying data between electronic devices mediated by an object.

In accordance with an aspect of the present disclosure there is provided a system providing object mediated data transfer between electronic devices, the system comprising: a first electronic device providing remote copy functionality, the first electronic device comprising a memory for storing instructions and a processor for executing the instructions stored in memory, the executed instructions configuring the device to provide functionality for copying data including: selecting copy data; receiving a remote copy command; determine a unique identifier discernable from the object; and associating the selected copy data with the unique identifier of the object; and a second electronic device providing remote paste functionality, the second electronic device comprising a memory for storing instructions and a processor for executing the instructions stored in memory, the executed instructions configuring the device to provide functionality for pasting data including: receiving a remote paste command; determining the unique identifier discernable from the object; locating the copy data the first electronic device associated with the unique identifier; and receiving the selected copy data the first electronic device associated with the unique identifier of the object.

In accordance with another aspect of the present disclosure there is provided a method of object mediated data transfer between electronic devices comprising: receiving a selection of data at a first electronic device; receiving at the first electronic device, a remote copy command; determining a unique identifier of an object; and storing remote copy data including the determined unique identifier of the object.

In accordance with yet another aspect of the present disclosure there is provided a non-transitory computer readable medium comprising instructions for implementing a method of object mediated data transfer between electronic devices comprising: receiving a selection of data at a first electronic device; receiving at the first electronic device, a remote copy command; determining a unique identifier discernable from the object; and storing remote copy data including the determined unique identifier of the object.

In accordance with yet still another aspect of the present disclosure a device providing remote copy and paste functionality, the device comprising: a memory for storing instructions; and a processor for executing the instructions stored in memory, the executed instructions configuring the device to provide: functionality for copying data including: receiving a selection of remote copy data; receiving a remote copy command; determining a unique identifier discernable from the object; and associate the selected remote copy data with the determined unique identifier of the object; and functionality for pasting data including: receiving a remote paste command; determining the unique identifier discernable from the object; locating remote pasting data associated with the unique identifier; and receiving the selected remote pasting data associated with the unique identifier.

Systems, devices and methods for transferring data between electronic devices are described further herein. The data transfer is mediated by an object or input device, such as a stylus, having a unique identifier that is discernable by the electronic device. Broadly, the object is associated with the unique identifier is associated with copy data at a first electronic device. The data can then be pasted to a second electronic device using the same object used to copy the data. The second electronic device uses the unique identifier of the object to locate the data to be pasted, which was associated with the same object by the first electronic device. Once the data is located, it can be transferred to the second electronic device. As described further below, locating the data to be transferred using the unique identifier of the object may be done by direct communication between the electronic devices, if they are located in close proximity to each other or on the same network, or may be done through a common server if the two devices are located at distant locations or are on separate networks.

FIGS. 1 to 8 depict user interactions for copying data between electronic devices mediated by an object. In FIGS. 1 to 8 the object is depicted as a stylus having a unique identifier of '123'. As depicted, the stylus 102 is used to select and copy data between a first electronic device 104 and a second electronic device 106. The stylus 102 is associated with a unique identifier, which is used to mediate the copying of data between the two electronic devices 104, 106. The details of copying the data between electronic devices is described further with reference to FIGS. 9 to 13, while the user interactions and displayed information on the devices are described with reference to FIGS. 1 to 8.

Turning to FIGS. 1 to 8, interactions involved in copying data between two electronic devices are depicted. It will be appreciated that the interactions described are only one illustrative possibility. Further, the copied data is depicted as text data; however, any type of data may be selected and transferred between electronic devices. For example, the data can include text, video, audio, pictures, e-mails, contacts, or any other type of data. Although the two devices 104, 106 are depicted as being adjacent to each other, it is noted that the two electronic devices do not need to be located in the same location. Further, the two device 104, 106 are depicted as being similar devices; however, it is contemplated that the electronic devices may be different from each other.

Figure 2:
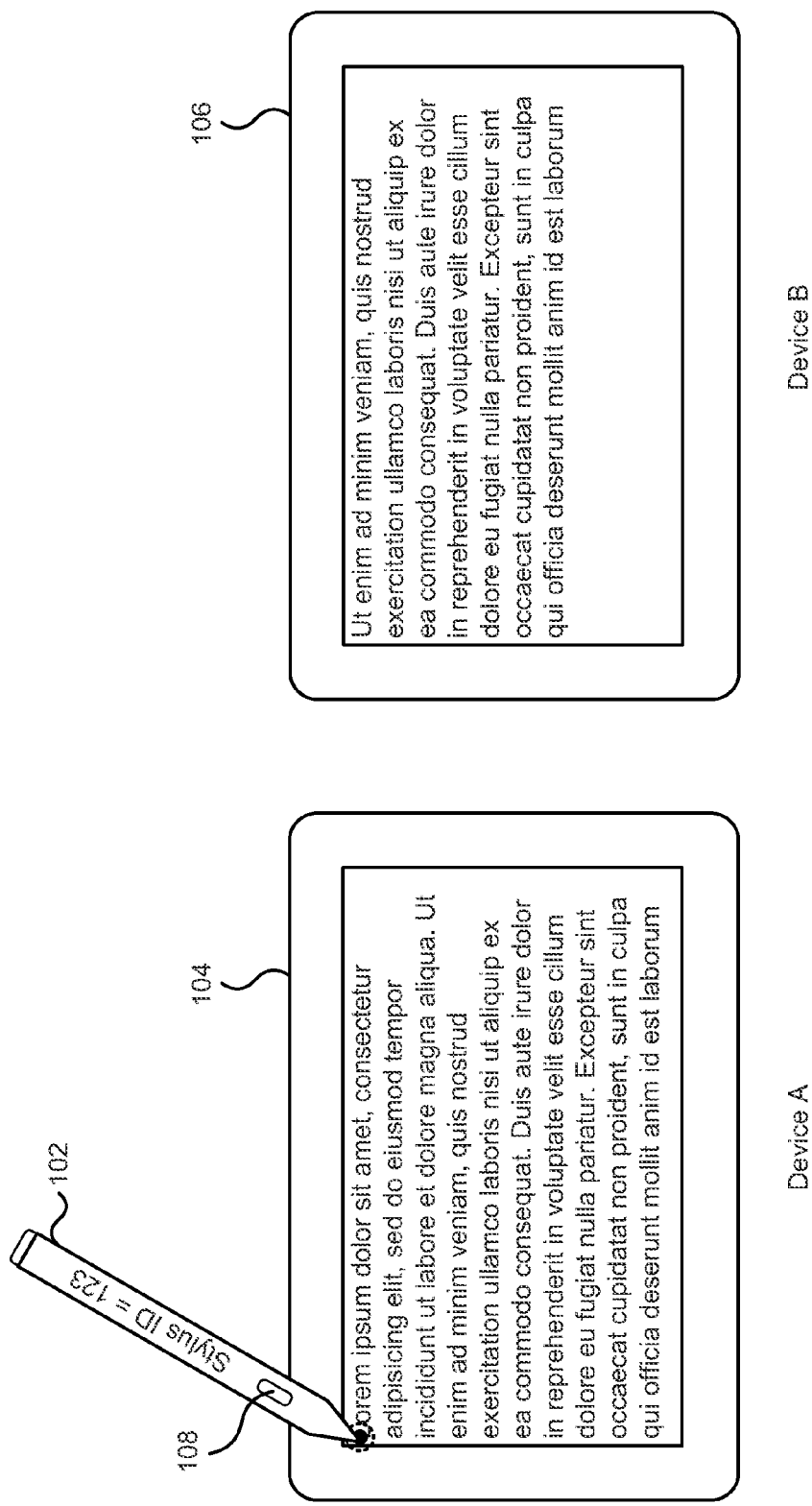
Figure 3:
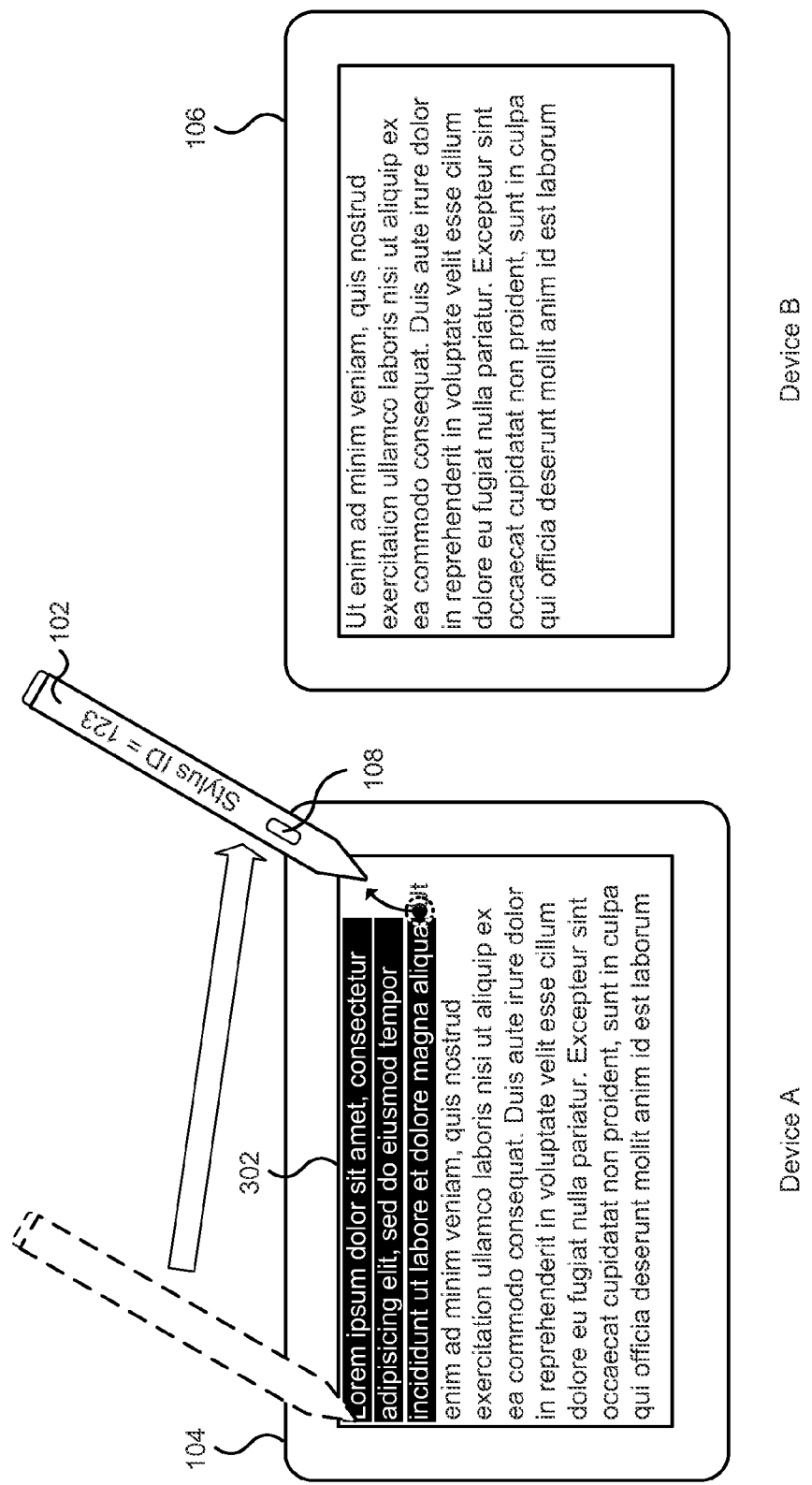
Figure 4:
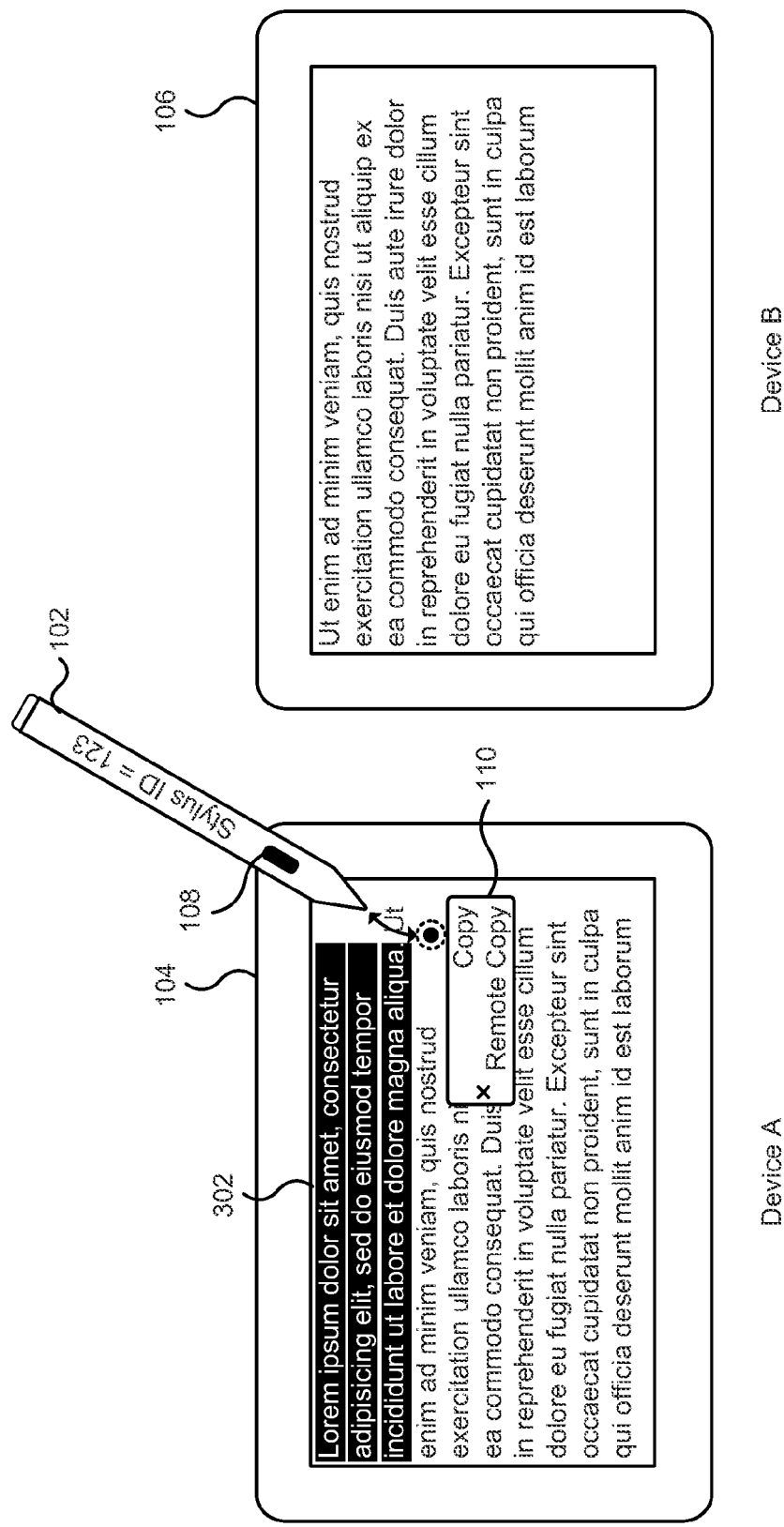
Figure 5:
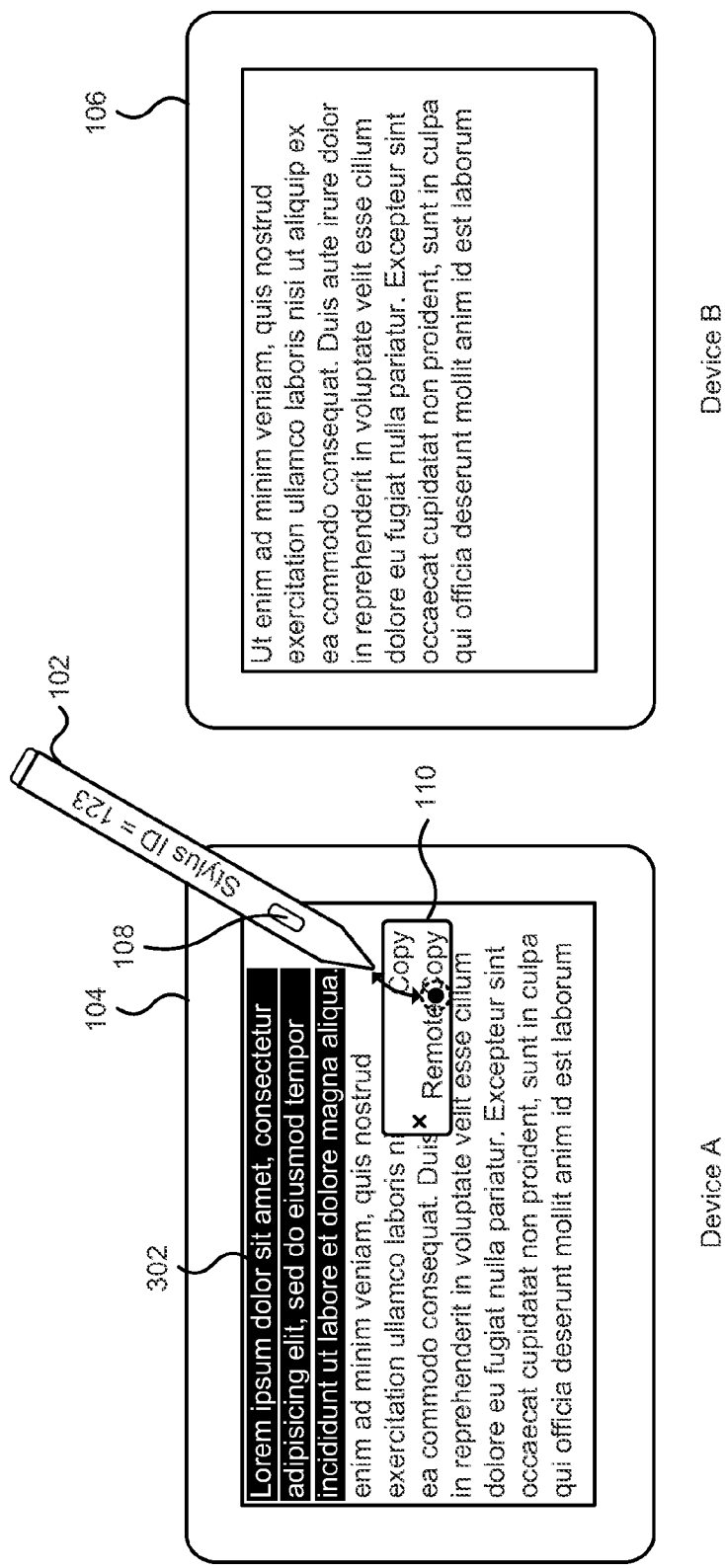

A user utilizes an object associated with a unique identifier, depicted as stylus 102, to select data on the first electronic device 104. In this example a portion of text is selected from a document on one electronic device and pasted into the text of another electronic device. The user may bring the stylus 102 into contact with, or in close proximity to, the touch-sensitive device at a location to begin a selection of the data, as depicted in FIG. 2, and drag the stylus 102 to a location to end the selection of data before lifting the stylus from the touch-sensitive display to select the data, as depicted in FIG. 3. As depicted in FIG. 3, the display may be modified to highlight the data that was selected 302. Once data is selected 302, the user may perform a gesture, depicted as an alternate tap, which may be similar to a right click of a mouse, with the stylus 102. The alternate tap of the stylus 102 may involve pressing a button 108 on a stylus while performing a tap on the screen. The alternate tap described may cause a copy menu 110 to be displayed as depicted in FIG. 4. The copy menu 110 may display one or more copy options including a remote copy option for transferring the selected data to another device. The user may select the remote copy option from the copy menu 110, for example by tapping on the remote copy option, depicted in FIG. 5.

Figure 6:
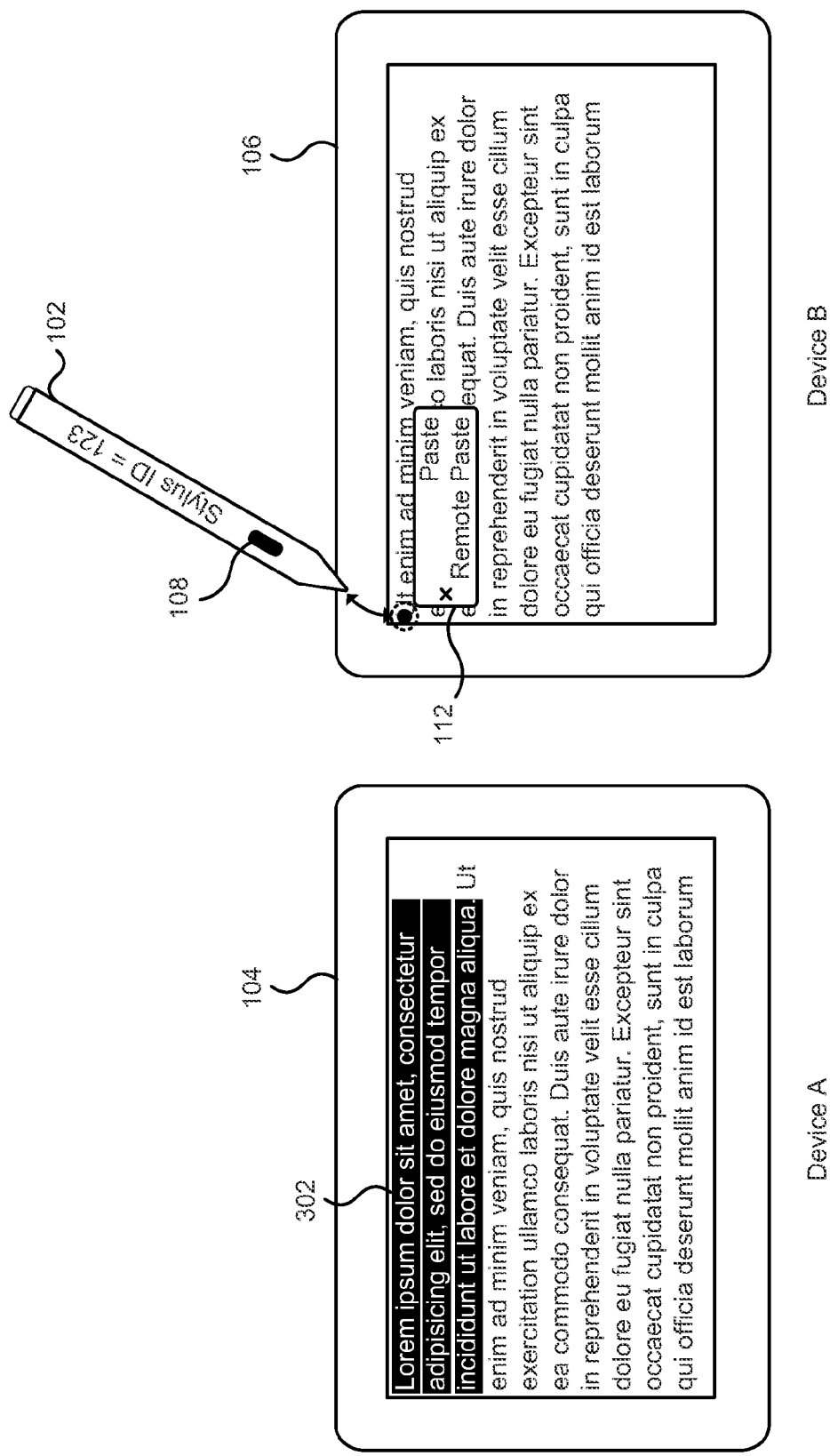
Figure 7:
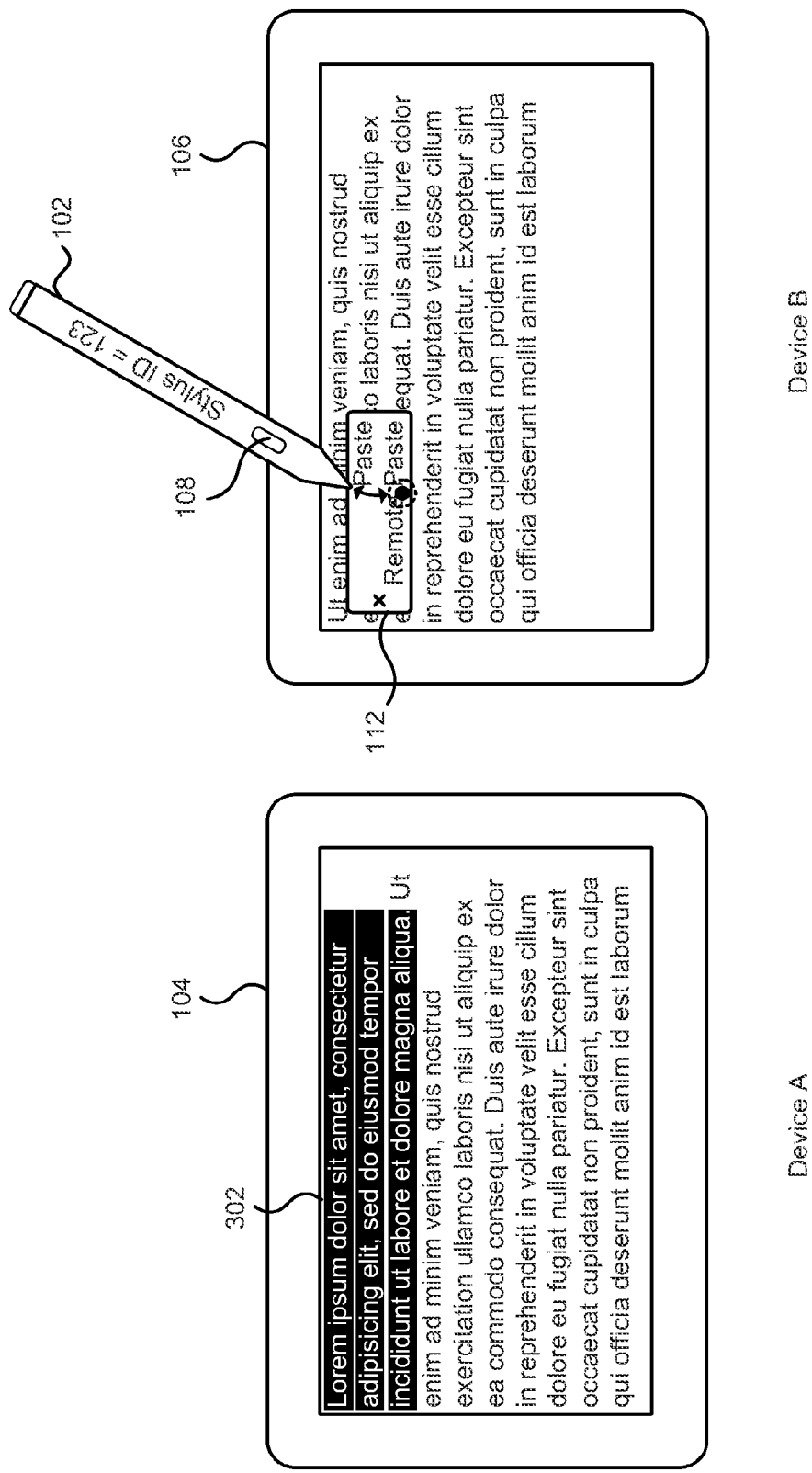
Figure 8:
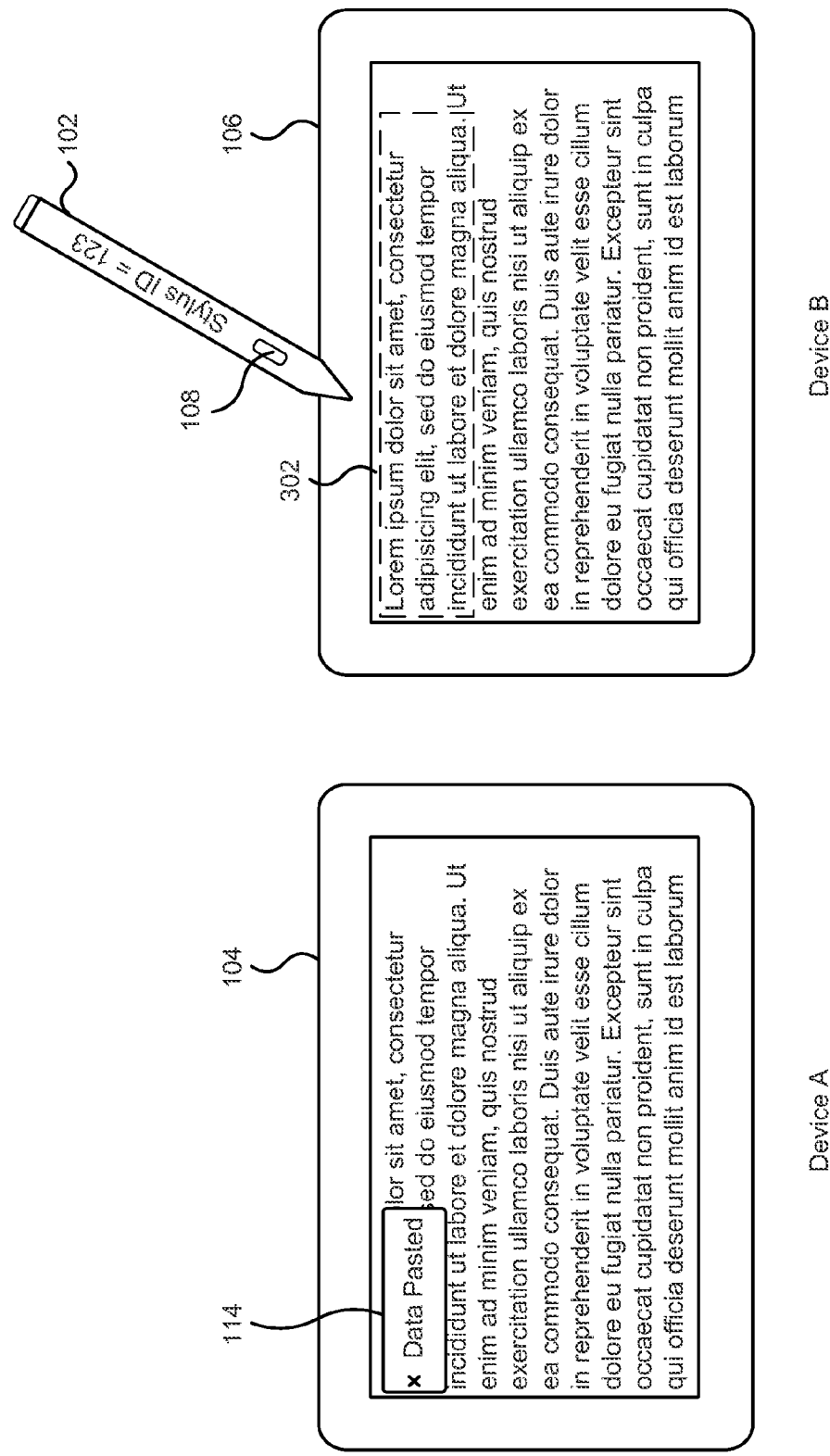

Subsequent to the remote copy command being selected at the first electronic device 104, the user may move the stylus 102 to the second electronic device 106 and perform a similar alternate tap, that is tapping the screen while pressing the button 108, to display a paste menu 112 as depicted in FIG. 6. The paste menu 112 may include a remote paste option, which the user may select by tapping as depicted in FIG. 7. Once the user selects the remote paste option, the previously copied data 302 from the first electronic device 104 is pasted to the second electronic device 106. The location of pasting the data 302 may be based on a cursor position on the second electronic device, allowing data to be pasted directly into a desired position within an application. The display of the second electronic device may be modified to indicate the data that was just pasted. Further the display of the first electronic device 104 may also be updated to reflect that the data was transferred to another device. For example, the highlighting of the previously selected text on the device may be un-highlighted. It is contemplated that the first electronic device may be used further, prior to pasting the data 302 at the second electronic device and as such, the highlighting of the selected data may be un-highlighted prior to pasting the data 302. As such, a notification 114 may be displayed on the first electronic device indicating that the data was pasted.

The above has described interactions for transferring data between devices using a stylus. It is contemplated that interactions other than those described above may be used to transfer the data between devices. For example, the specific gestures described for selecting data, initiating the remote copy and the remote paste functionality and the display of information on the displays may be changed or modified. It is also contemplated that the initiation of the copy or paste actions may be by other actions such as a specific movement of the object or stylus 102, or on-screen selection rather than a tap action. In addition, non-button interfaces such as on-screen or gesture movement (e.g. a specific movement triggers action) of the object such as a stylus 102 may be utilized to initiate actions. Interaction of the object with the electronic device may not require direct contact but may occur as the stylus hovers above the screen or input device of the electronic device and so even if a physical button is used on a stylus, a user could interact with the electronic device by clicking an associated button to bring up the menu for performing a copy or paste without first having to touch the stylus to the screen or input device.

Figure 9:
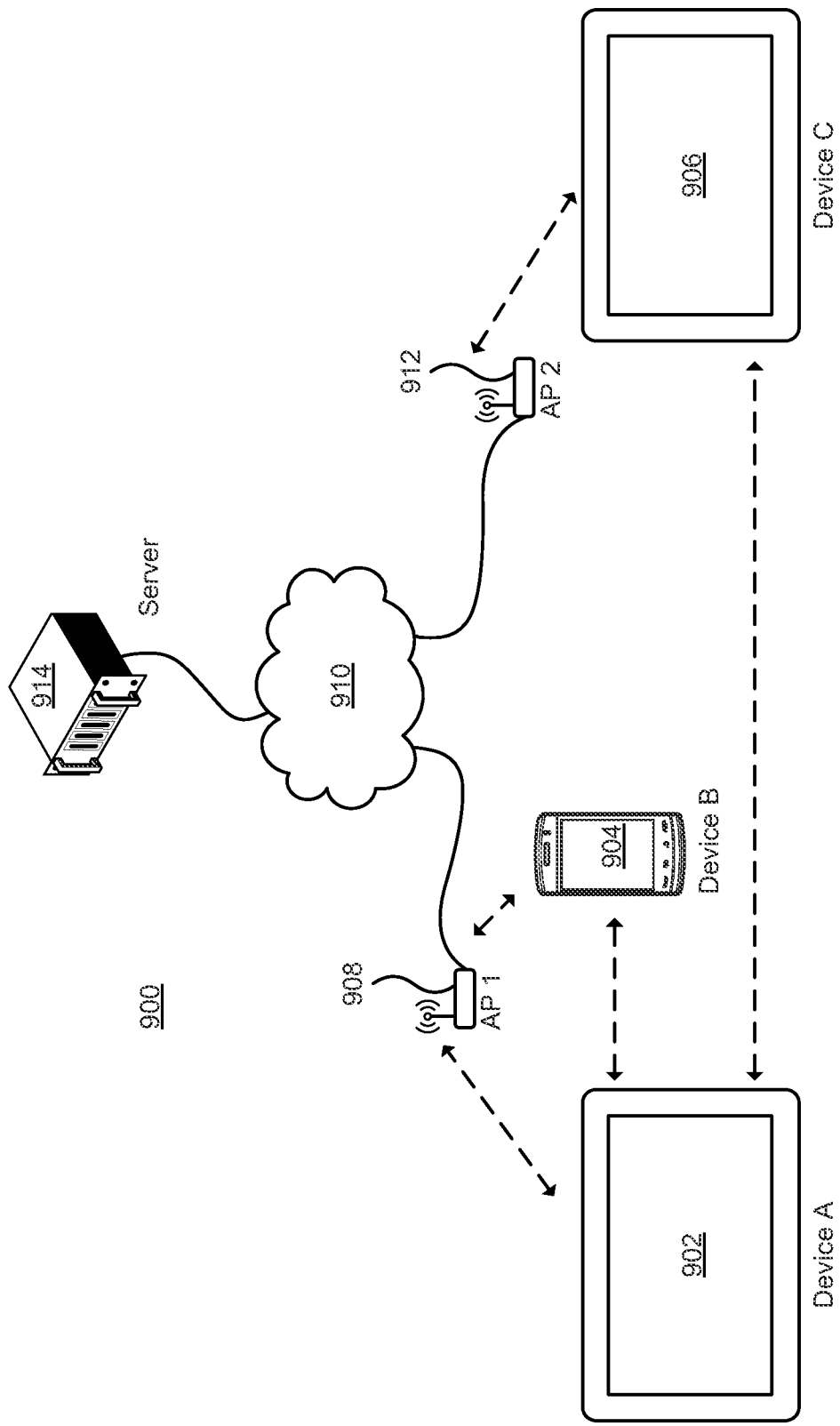
FIG. 9 depicts an environment in which data can be transferred between electronic devices.

FIG. 9 depicts an environment in which data can be transferred between electronic devices. The environment 900 includes a plurality of electronic devices 902, 904, 906. The electronic devices can communicate with each other. The communication may be accomplished using one or more wired or wireless communication protocols. For example Device A 902 may communicate with Device B using wireless communication such as Bluetooth, Wi-Fi, GSM, HSPDA, HSPA+, LTE, WiMax, or other wireless communication technologies, either directly or indirectly. For example the electronic devices may communicate directly via Bluetooth wireless technology or may communicate with each other through a wireless access point 908 or other intermediary electronic device or network. For example, the wireless access point 908 may provide a local area network allowing the two electronic devices 902, 904 to communicate with each other. The electronic devices may also communicate with each other through a network 910, such as the Internet. For example, Device A 902 may communicate with Device C 906 through two access points 908, 912 connected together through the network 910.

The environment 900 may further comprise a server or servers 914 in communication with the electronic devices. The server 914 may be used in facilitating the transfer of data between electronic devices that cannot communicate with each other directly. The server may also be used to facilitate data transfer between electronic devices that can communicate with each other directly, although not required.

Figure 10:
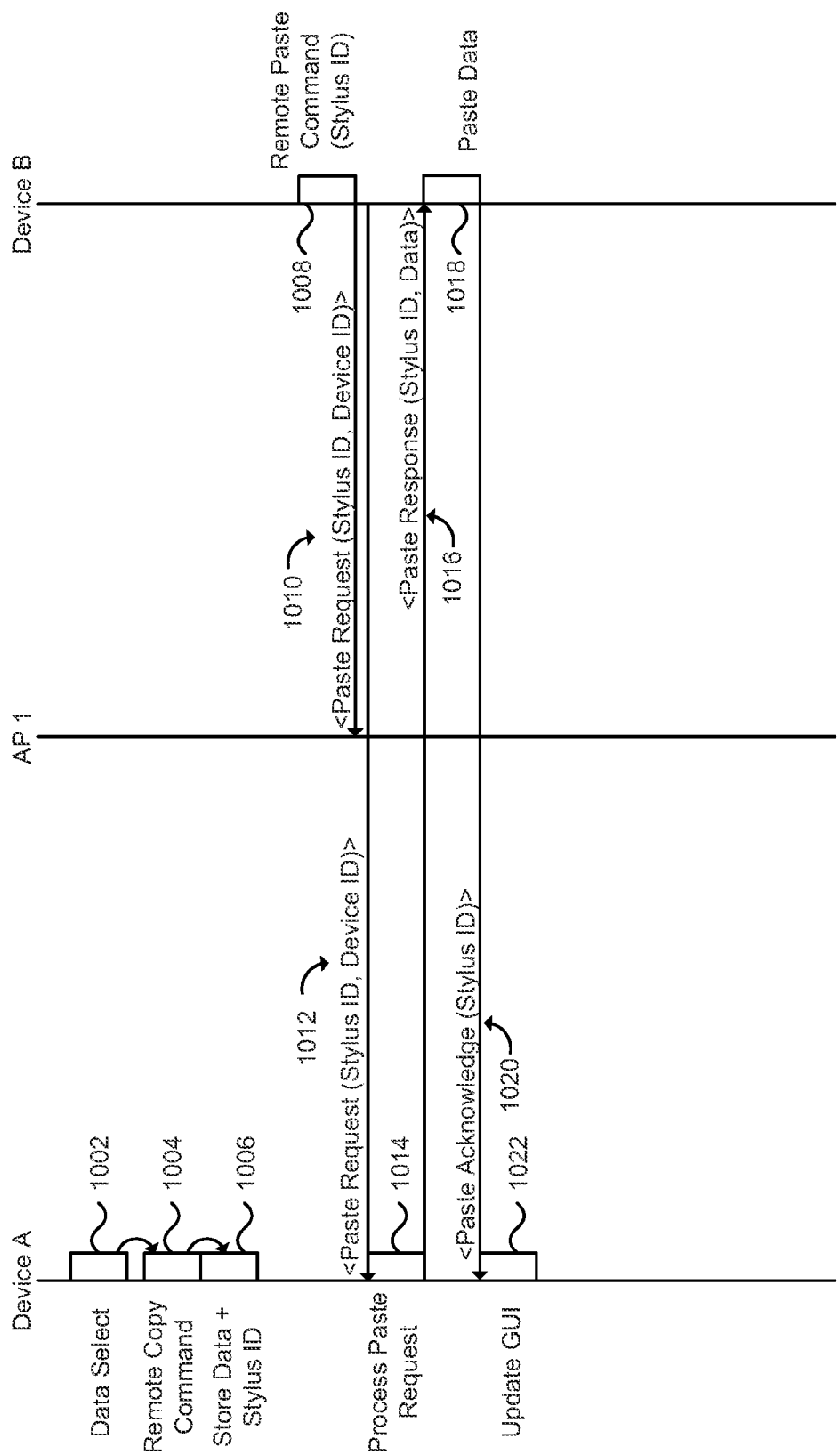
FIG. 10 depicts a process of successfully transferring data between electronic devices on a common local network.

FIGS. 10 to 13 depict various process flows for transferring data between electronic devices in the environment 900. FIG. 10 depicts a process that successfully transfers data between two electronic devices on a common local wired or wireless network. The electronic devices may be for example Device A 902 and Device B 904 that can communicate with each other through wireless access point 908 or using a Bluetooth connection. A user of Device A 902 selects data (1002) for copying to a remote electronic device. The data may be selected in various ways, such as using a stylus, keyboard, touch gestures or other input mechanisms. Once the data is selected the user may initiate a remote copy command (1004). The remote copy command may be initiated by a tap, menu selection, touch gesture, by identification of the object by the electronic device, or other input means. Once the remote copy command is initiated, Device A stores the selected data, or an indication of the selected data, and a unique identifier associated with the object (1006), such as the stylus. The unique identifier of the object may be determined by Device A in various ways. For example, the object may be able to communicate with the electronic device, in which case it can provide the unique identifier to the electronic device. Alternatively, the object may be a passive object, in which case Device A may identify the unique identifier using available sensors, such as a radio frequency identifier (RFID) reader, near field communications (NFC) or other sensors capable of uniquely identifying the object.

At some point after the data and associated unique identifier is stored at Device A, a user initiates a remote paste command on a second Device B using the same object (1008). Device B communicates a remote paste request with the unique identifier of the object to Device A. It is noted that Device B may have no knowledge of what electronic device the data was copied from, and so may not have any knowledge of where to send the remote paste request. As such, Device B may broadcast the remote paste request with the unique identifier of the object to all the electronic devices connected to the wireless access point 908, including the wireless access point itself (1010) as well as Device A (1012). It is noted that although depicted as different messages, the broadcast of the remote paste request may be accomplished by sending a single broadcast message that all electronic devices connected to the wireless access point are capable of receiving. Regardless of the particular communication mechanism used to send the remote paste request, Device A receives the remote paste request and checks the unique identifier of the request to see if the unique identifier matches any of the unique identifiers associated with copy data that the electronic device has stored from remote copy commands. Device A locates the previously stored remote copy data associated with the unique identifier of the object (1014) and sends the remote copy data back to Device B (1016). Device B receives the remote copy data and pastes it (1018). Device B may then send an acknowledgement message back to Device A (1020). Device A receives the acknowledgement message and can update the graphical user interface display to indicate that the data has been pasted (1022).

Figure 11:
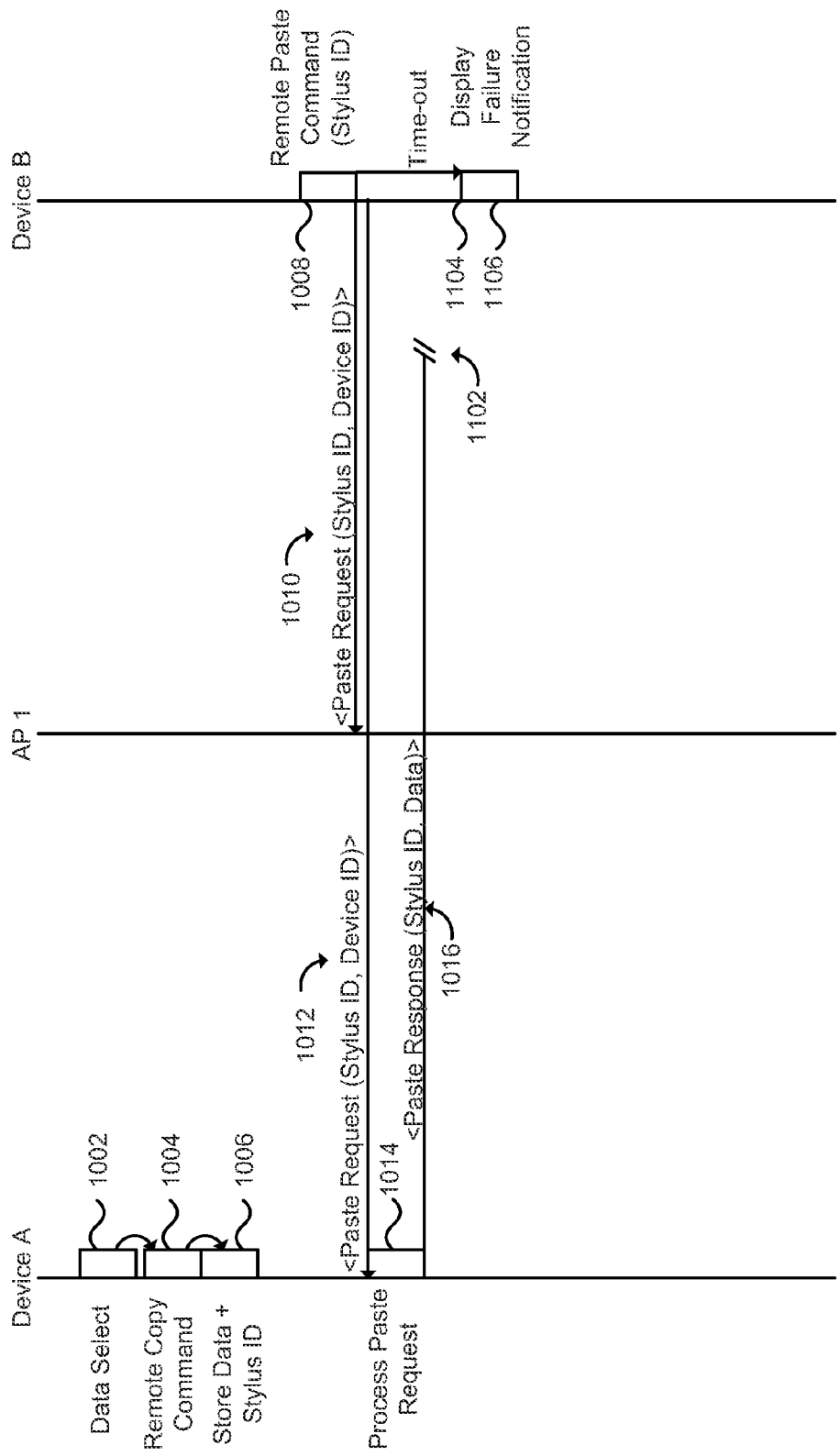
FIG. 11 depicts a process of unsuccessfully transferring data between electronic devices on a common local network.

FIG. 11 depicts a process that unsuccessfully transfers data between two electronic devices on a common local network. The process of FIG. 11 begins in an identical manner as described above with reference to FIG. 10. The steps 1002 to 1016 are the same as described above, and as such are not described further herein. Device A attempts to send the located remote copy data back to Device B (1016); however, as depicted the response is not received by Device B (1102). The remote paste request sent by Device B eventually times out when the response is not received (1104). Upon timing out, Device B may update the display to indicate the failure of the remote paste command (1106). The failure may be indicated by, for example displaying a notification. The user may then attempt to retry the remote paste action.

The above has described Device A and Device B as communicating with each other through an access point. It is contemplated that the electronic devices could communicate directly with each other, using for example, an ad-hoc network, direct wireless connection, or bridge connection established directly between the two electronic devices. The connection between the electronic devices could be established using various communication protocols, including for example, Wi-Fi, Bluetooth, or other wireless communication protocols.

Figure 12:
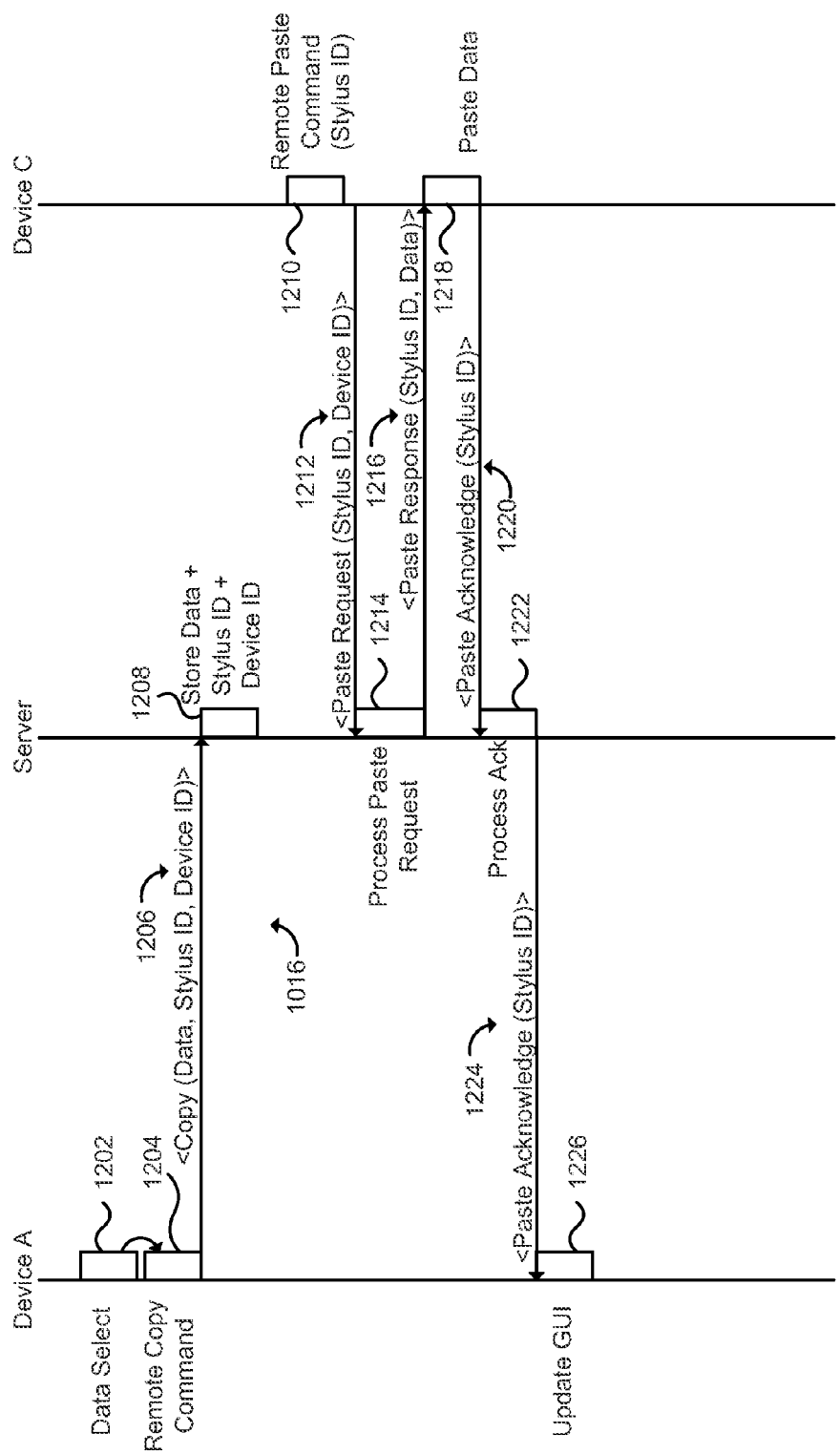
FIG. 12 depicts a process of transferring data between electronic devices using an intermediary server.

FIG. 12 depicts a process of transferring data between two electronic devices using an intermediary server. The process 1200 depicted in FIG. 12 may be used to transfer data between two electronic devices when the two electronic devices cannot establish a direct connection without the help of an intermediary server. Further, the use of the server provides a single location that a electronic device can send a remote paste request to, allowing electronic devices to locate remote copy data that was pasted from electronic devices on separate networks. The process 1200 is generally similar to the process of 1000; however, the remote copy data, and the associated unique identifier of the object, is stored at the server instead of at the electronic device.

A user of Device A selects data (1202) for copying to a remote electronic device. Once the data is selected the user may initiate a remote copy command (1204) using an object having a unique identifier. Once the remote copy command is initiated, Device A sends the selected data and the unique identifier of the object to the server (1206). As depicted, Device A may also include a device ID in order to allow the server to subsequently communicate with the electronic device. The server stores the remote copy data with the associated unique identifier and device ID (1208).

At some point in time after the remote copy data and associated unique identifier is stored at the server, a user initiates a remote paste command on a second electronic device, namely Device B, using the same object (1210) used to copy the data from Device A. Device B identifies the unique identifier and communicates a remote paste request with the unique identifier of the object to the server (1212). As depicted the remote paste request may include an identifier of the requesting electronic device in order to allow return communication with the electronic device.

The server may be located at a location known to both Device A and Device B, allowing each electronic device to communicate with the server. Since the server may be located at a known location, it is possible to configure network security, such as firewalls or network address translators, to allow communication with the server. The server receives the remote paste command and checks the unique identifier of the paste request to see if the unique identifier matches any of the unique identifiers associated with remote copy data from electronic devices that the server has stored. The server locates the remote copy data associated with the unique identifier of the object that was received and stored from Device A (1214). The server sends the remote copy data back to Device B (1216). Device B receives the remote copy data and pastes it (1218). Device B sends an acknowledgement message back to the server (1220) indicating that the data has been pasted. The server receives the acknowledgement and processes it (1222), which may include, for example marking the remote copy data with the unique identifier of the object as being pasted as well as determining the device ID associated with the remote copy data in order to subsequently communicate with the electronic device. The processing may also comprise sending the acknowledgement back to Device A (1224). Device A receives the acknowledgement message and can update the display to indicate that the data has been pasted (1226).

The process 1200 described above describes the remote copy data as being stored at the server. It may be desirable to store the remote copy data at the electronic device that copied the data. Storing the data at the electronic device instead of at the server may reduce the storage requirements of the server, as well as reduce the amount of data required to be processed by the server.

Figure 13:
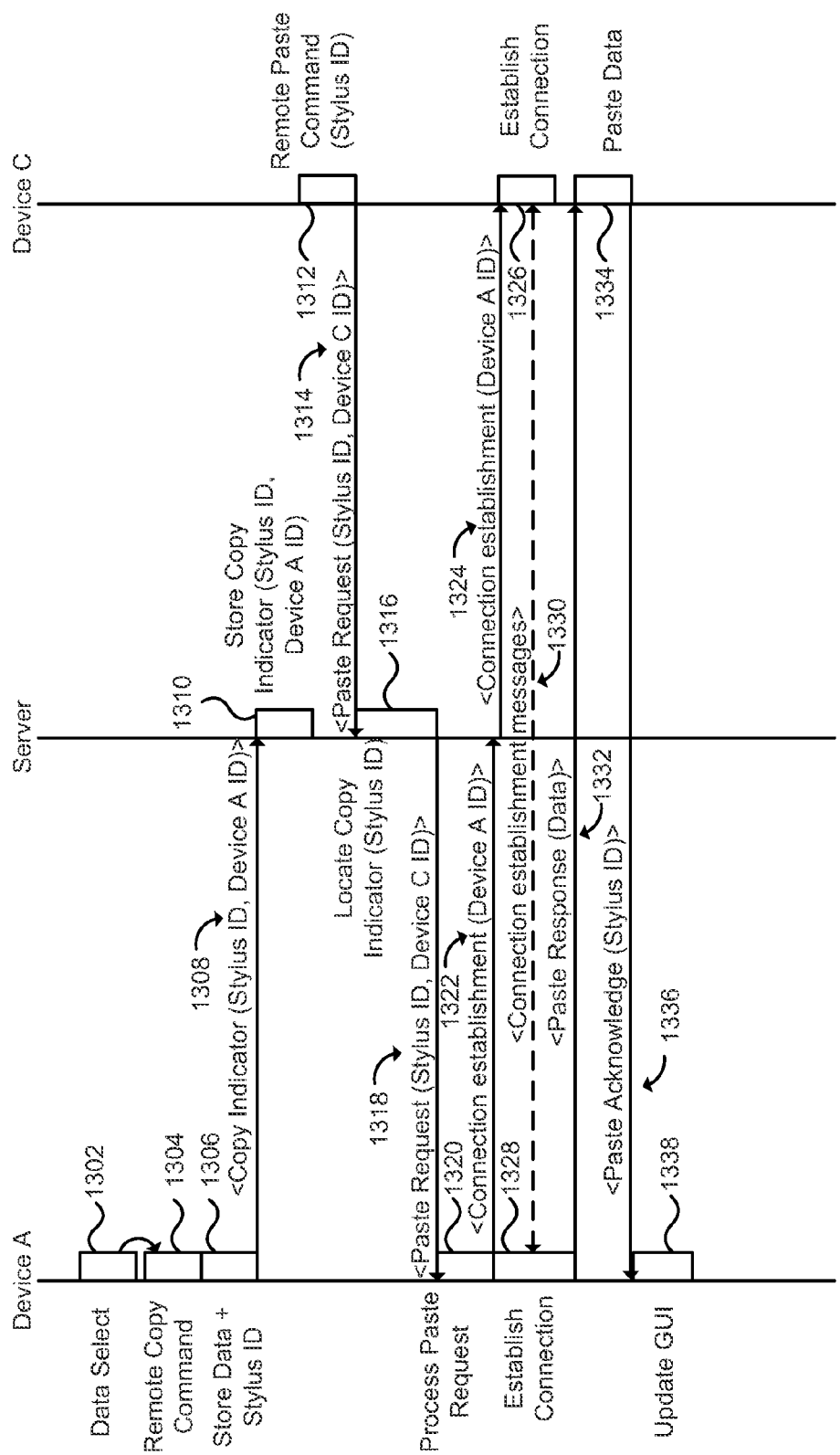
FIG. 13 depicts a further process of transferring data between electronic devices using an intermediary server.

FIG. 13 depicts a further process of transferring data between two electronic devices using an intermediary server. The process 1300 stores the remote copy data at the copying electronic device rather than at the server. The server maintains unique identifiers that have copied data as well as the associated electronic device in order to facilitate subsequent transfer of the data between electronic devices. A user of Device A selects data (1302) for copying to a remote electronic device. Once the data is selected the user may initiate a remote copy command (1304) using an object having a unique identifier. Once the remote copy command is initiated, Device A stores the selected data, or an indication of the selected data, with the unique identifier of the object (1306). Device A then sends the unique identifier of the object to the server (1308) indicating that remote copy data is available. The electronic device may also include an electronic device identifier for allowing subsequent communication with the electronic device. The server stores the unique identifier (1310) and the electronic device identifier or other information about Device A to allow communication to be subsequently established with the electronic device.

At some point after the unique identifier is stored at the server, a user initiates a remote paste command on a second electronic device, namely Device B, using the same object (1312) used to copy the data at Device A. Device B communicates the remote paste request with the unique identifier of the object to the server (1314). The server receives the remote paste command and checks the unique identifier of the paste request to see if the unique identifier matches any of the unique identifiers stored at the server indicating that an electronic device has remote copy data associated with the unique identifier (1316). The server locates the unique identifier and communicates the paste request, including the unique identifier and the identifier of Device C, to the electronic device associated with the unique identifier (1318). Device A receives the remote paste requests and processes the request (1320), which includes attempting to establish a connection with Device C. Device A may communicate a connection establishment message to the server (1322), which can forward the message to Device C (1324). Both Device A and Device C attempt to establish a direct connection (1326), (1328) with each other by exchanging messages (1330). The connection establishment may use various methods for establishing the direct connection. For example, the electronic devices and server may provide session initiation protocol (SIP) functionality, which can establish a direct connection between two electronic devices with the assistance of an intermediary server. Once the direct connection is established between the two electronic devices, the remote copy data can be sent from Device A to Device B using the established connection (1332). Once Device B receives the remote copy information, it pastes the data (1334) and sends an acknowledgement of the remote pasting back to the Device A (1336). Device A receives the paste acknowledgement and updates the display to reflect that the data has been pasted (1338). For example, if the selected data being copied is highlighted, the display may be updated so that it is no longer highlighted. Additionally or alternatively, a notification can be displayed indicating that the data has been pasted on the remote electronic device. Although not depicted in FIG. 13, the server may also be notified that the remote copy data has been pasted and update the stored information to reflect the pasting of the data.

FIG. 13 depicts transferring the remote copy data directly between the two electronic devices. It is contemplated that remote copy data could be sent from Device A to the server and then forwarded on to Device C, instead of over an established connection between the electronic devices. This may be useful in situations where it may not be possible to establish the direct connection between the two electronic devices.

It will be appreciated that in order to paste data from an electronic device using the process described with regards to FIG. 10 or 13, the copying electronic device must be able to communicate with the pasting electronic device. In contrast, the transferring process described with reference to FIG. 12 does not require further communication with the copying electronic device once the remote copy data has been copied to the server.

Figure 14:
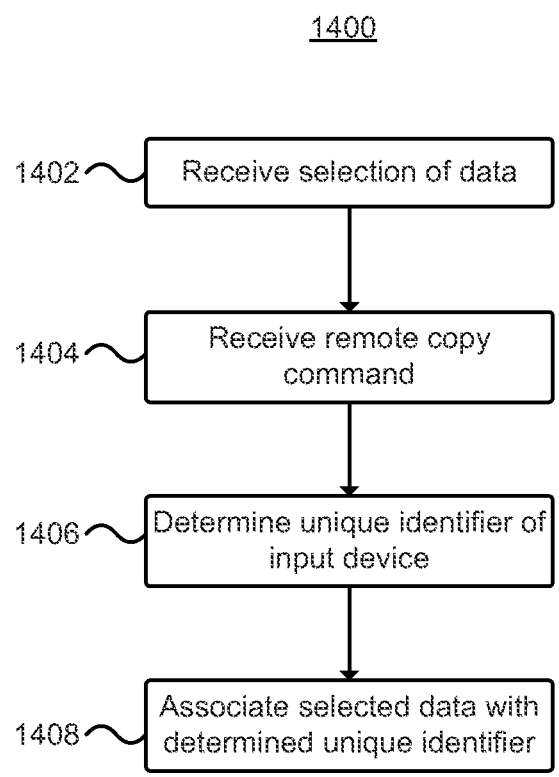
FIG. 14 depicts a method of remotely copying data.

FIG. 14 depicts a method of remotely copying data. The method 1400 begins with receiving a selection of data at a first electronic device (1402). The selection of data may be accomplished using an object with a unique identifier. Additionally or alternatively, the selection may be accomplished using a keyboard and/or a mouse. For example, data may be selected by clicking on an icon representation of the data with a mouse. Additionally or alternatively, the selection of data may be accomplished using a menu or touch gestures to initiate the action. It is contemplated that the selection of data may be accomplished using voice commands or other selection means.

Once data is selected, a remote copy command can be received at the first electronic device (1404). Similar to the selection of the data, the remote copy command may be accomplished in various ways. For example the object with the unique identifier may be used to perform a right click gesture, which displays a remote copy menu allowing the remote copy command to be selected. The remote copy command can be provided by a touch gesture, through a menu selection, using voice commands, or other options for initiating an action.

The electronic device determines a unique identifier of an object (1406). The object may be for example a stylus. The stylus may be an active stylus that can communicate with the electronic device. As such, the stylus can communicate the unique identifier to the electronic device, or the unique identifier is discernable from the stylus by the electronic device by short-range or near field communication or by inductive identification systems. It is contemplated that the object can be other objects or electronic devices capable of providing a unique identifier to be associated with the copying and pasting actions; however, the object should be portable to allow it to be moved from a copying electronic device to a pasting electronic device.

The method stores an indication that remote copy data is available including the determined unique identifier of the object (1408). The electronic device may store the remote copy data with the unique identifier locally. Additionally or alternatively, the unique identifier may be stored at a server, which provides an indication that remote copy data is available. Additionally or alternatively, the unique identifier may be stored with the remote copy data at the server.

Figure 15:
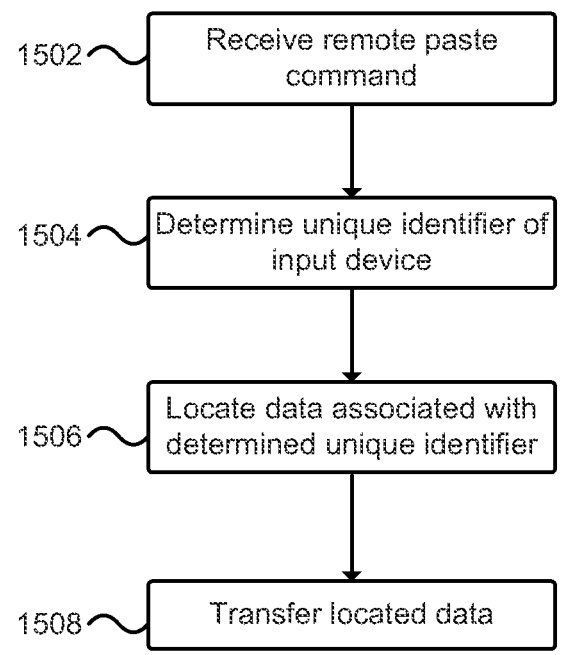
FIG. 15 depicts a method of remotely pasting data.

FIG. 15 depicts a method of remotely pasting data. The method 1500 may be used to remotely paste data that was copied from an electronic device, for example as described above with reference to FIG. 14. Method 1500 begins with receiving a remote paste command at an electronic device (1502). The remote paste command may be initiated using various means, such as use of a stylus, touch gestures, voice commands, keyboard and/or mouse inputs, menu selections or other means of initiating an action on an electronic device. The electronic device determines a unique identifier associated with an object (1504). The object may be used to initiate the remote paste command as described above, or may be located in proximity to the electronic device in order to allow the electronic device to determine the unique identifier of the object. Once the unique identifier of the object is determined, the electronic device locates the remote copy data associated with the unique identifier (1506). The remote copy data may be located by communicating directly with the electronic device that copied the remote copy data, or by communicating with an intermediary server. Once the remote copy data is located, it is transferred to the electronic device and pasted (1508). Once the remote copy data is pasted, the electronic device may send an acknowledgement back to the copying electronic device, which may indicate that the remote copy data was pasted on a remote electronic device.

Figure 16:
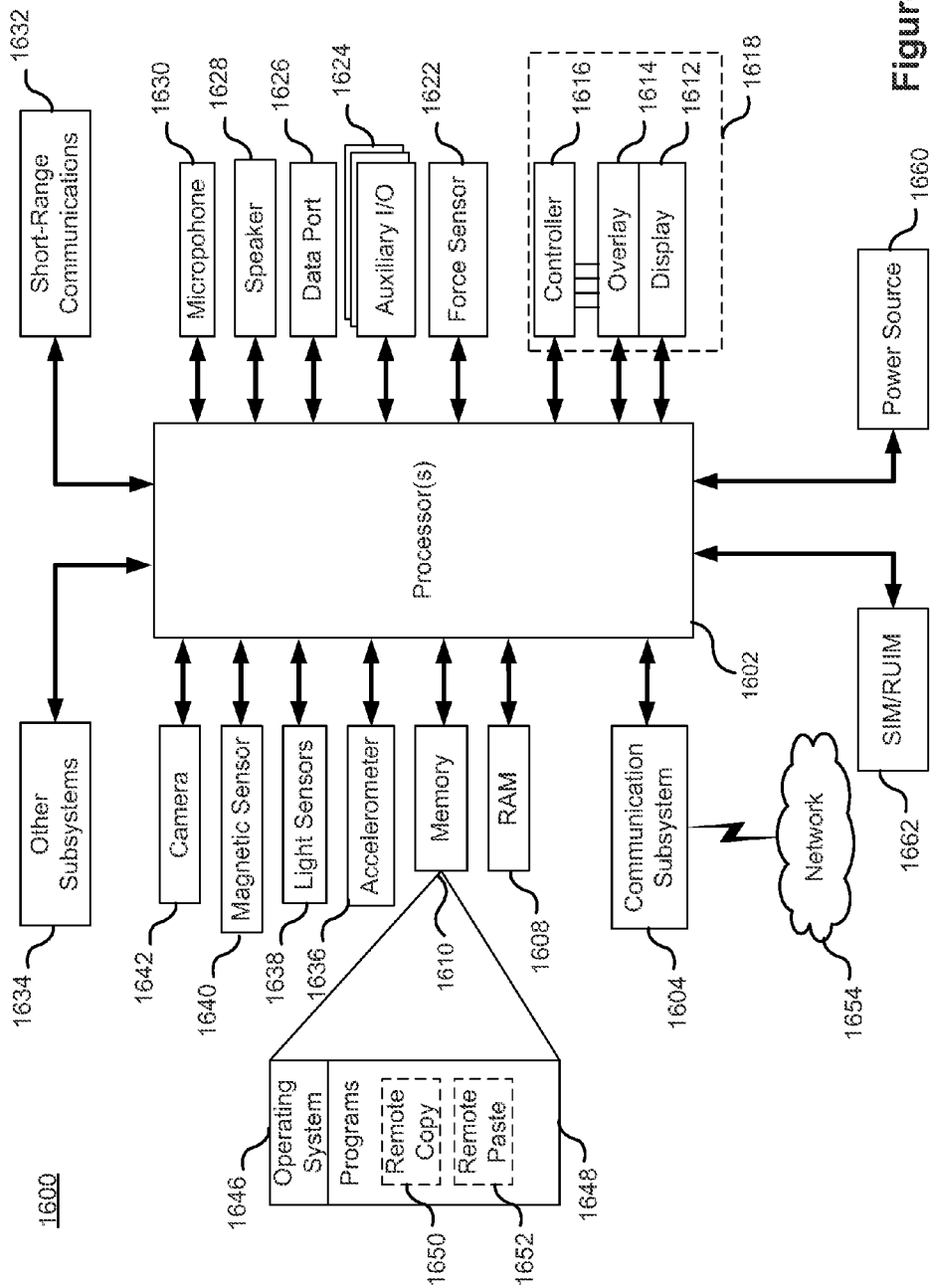
FIG. 16 depicts in a diagram a device for remotely copying and pasting data.

FIG. 16 show a block diagram of an electronic device 1600 in accordance with an illustrative embodiment. Although the illustrative embodiment depicts a electronic device with a touch-sensitive display, it is contemplated that the touch-sensitive device could be external to the electronic device and connected by a data bus such as a universal serial bus (USB). A processor 1602, a multiple core processor or multiple processors may interface with component or modules of the electronic device to provide functionality required. A touch-sensitive interface is provided by a touch-sensitive display 1618 is coupled to the processor 1602. The touch-sensitive display 1618 may be any suitable touch-sensitive display, such as a capacitive, resistive, infrared, dispersive signal, acoustic pulse recognition, optical imaging, surface acoustic wave (SAW). In the presently described example embodiment, the touch-sensitive display 1618 is a capacitive touch-sensitive display which includes a capacitive touch-sensitive overlay 1614. The overlay 1614 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). In order to detect proximity information above the display the gain of the touch-sensitive display may be increased to enable sensing of proximity information. In addition the proximity information may be detected through multiple techniques to provide proximity accuracy, for example capacitive input may be combined with optical or infrared input to provide more accurate estimations of the object position. The proximity information may comprises one or more values to provide distance, direction and velocity vectors to aid in predict a particular action that may occur.

Although the electronic device described in FIG. 16 provides for a touch-sensitive display as a user interaction interface, a touch-sensitive interface may not be required if interaction is performed by an object such as a stylus with a non-touch-sensitive input device. The non-touch-sensitive input device may for example utilize a passive system based on an electromagnetic induction interface which may not detect touch except for a particular input object such as a stylus. An active stylus system may also be utilized in combination with a touch-sensitive display and may use a layer separate from the capacitive touch layer in order to detect the position of the stylus. Alternatively the interaction interface may be separate from the electronic device or display. The unique identifier may be determined by a contactless short-range wireless communications technologies or inductive identification which determines when the object such as a stylus is in proximity with the electronic device. The interaction interface may also utilize cameras to determine position of objects relative to the display rather than a touch-sensitive display.

The processor 1602 interfaces with memory 1610 providing an operating system 1646 and programs or applications 1648 providing instructions for execution by the processor 1602. Random access memory 1608 is provided for the execution of the instructions and for processing data to be sent to or received from various components of the electronic device. The instructions when executed by the processor 1602 may configure the electronic device to provide various functionality for transferring data. The functionality may include the remote copying functionality 1650 and remote pasting functionality 1652 described herein. For example, the functionality for remotely copying data may include functionality for selecting data, receiving a remote copy command, determining a unique identifier of an object, and associating the selected data with the unique copy identifier of the object for the remote copy command. The functionality for remotely pasting data may include, for example, receiving a remote paste command, determining a unique identifier of an object, locating remote copy data associated with the unique identifier and pasting the located remote copy data. Although the remote copying functionality 1650 and remote pasting 1652 functionality is depicted as being separate from the operating system 1646, it is contemplated that the functionality could be provided as component of the operating system.

Various input/out devices or sensors may be provided such as an accelerometer 1636, light and/or infrared sensors 1638, magnetic sensor 1640 such as a Hall Effect sensor, and one or more cameras 1642 which may be used for detection of an object above the touch-sensitive display. A communication subsystem 1604 is provided for enabling data to be sent or received with a local area network 1654 or wide area network utilizing different physical layer and access technology implementations. The communication subsystem may be utilized to request and pre-cache data based upon possible gesture event outcomes.

A subscriber identity module or removable user identity module 1662 may be provided depending on the requirement of the particular network access technology to provide user access or identify information. Short-range communications 1632 may also be provided and may include near-field communication (NFC), radio frequency identifier (RFID), Bluetooth technologies. The electronic device may also be provided with a data port 1626 and auxiliary input/output interface for sending and receiving data. A microphone 1630 and speaker 1628 may also be provided to enable audio communications via the electronic device 160.

The display 1612 of the touch-sensitive display 1618 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area. The non-display area may be utilized to initiate a copy or paste action rather than menu selection or gesture on the display area on the display.

One or more touches, also known as contact inputs, touch contacts or gesture events, may be detected by the touch-sensitive display 1618. The touches or gesture events may be performed using a finger, stylus or other object. The processor 1602 may determine attributes of the gesture event, including a location of contact. The processor may also determine attributes associated with the gesture of the gesture event, such as a height above the screen of an object prior to the contact. Gesture event information may include an area of contact or a single point of contact, such as a point at or near a center of the area of contact, known as the centroid. A signal is provided to the controller 1616 in response to detection of a contact. A contact may be detected from any suitable object, such as a finger, thumb, appendage, or other items, for example, a stylus, pen, or other pointers, depending on the nature of the touch-sensitive display 1618. The location of the contact moves as the detected object moves during the gesture. The controller 1616 and/or the processor 1602 may detect a contact by any suitable contact member on the touch-sensitive display 1618. Similarly, multiple simultaneous touches are detected. Further, the processor may determine proximity information of a gesture prior to actual contact. Additional proximity information may include information indicative of a height of the object above the screen as well as a location on the screen the object is located above. The controller 1616 may process information from multiple inputs such as the camera 1642, light or infrared sensor 1638 in combination with overlay data to determine proximity information above the touch-sensitive display.

Figure 17:
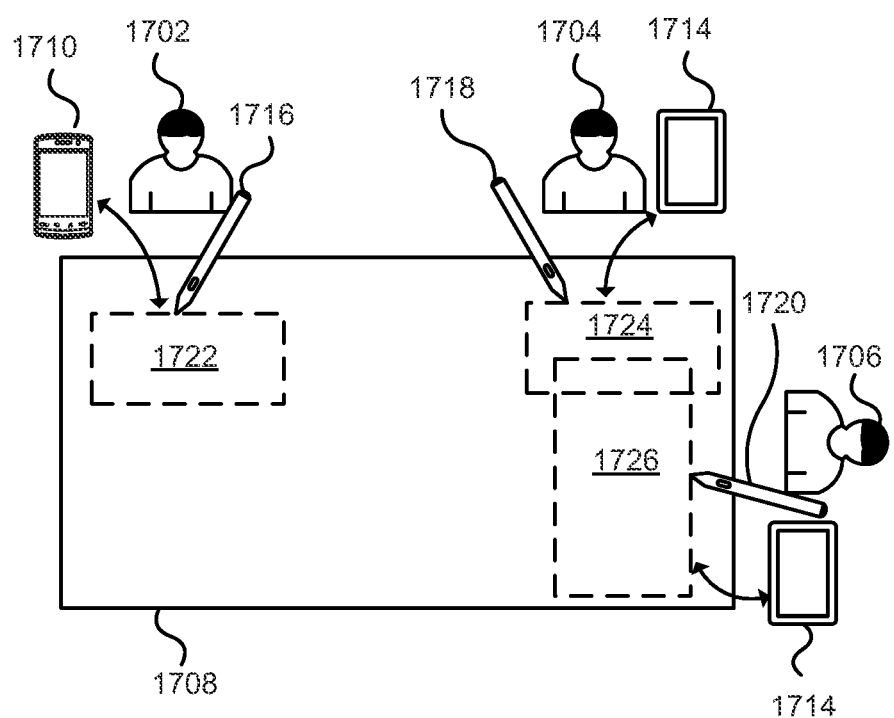
FIG. 17 depicts an illustrative environment in which the remote copying and pasting described above may be used.

FIG. 17 depicts an illustrative environment 1700 in which the remote copying and pasting described above may be used. The above has described the copying and pasting of data with regards to a single user. The remote copying and pasting may also be advantageous when multiple users are collaborating on a project. As depicted, a plurality of users, 1702, 1704, 1706 may all interact with a common electronic device 1708. For example, the electronic device could be a table-top computer, a projected display or other types of electronic devices that allow multiple users to interact with the computer. Each user 1702, 1704, 1706 has their own electronic device, 1710, 1712, 1714 and associated object, 1716, 1718, 1720 each having a unique identifier. As depicted each user 1702, 1704, 1706 may use their object 1716, 1718, 1720 to select data, 1722, 1724, 1726, from the common electronic device 1708. The users may select the data in various ways, however, when multiple users are capable of selecting data at the same time, some mechanism is required to determine which selection is associated with which object, and one simple solution is to use the object to select the data. Once users have selected data they can copy it to their own electronic devices 1710, 1712, 1714. As an example, the users could use the common electronic device 1708 in order to divide required tasks of a project among each of the users. Each user could then select their associated tasks and copy them to their own electronic device.

Although various embodiments have been described above, it will be appreciated that further modifications of the remote copying and pasting are possible. For example, the above has described copying a single piece of selected data and then pasting the copied data. It is possible to allow multiple pieces of selected data to be copied. When pasting, rather than simply providing the piece of data, the pasting electronic device may be provided with a list of the copied data that may be copied. For example, a user could copy a contact card, a calendar appointment and selected text from a document at a first electronic device such as a work computer. The user could then be presented with the different types of data available for pasting. The user could paste the contact card into their contact management application, the calendar appointment into their calendar application, and the selected text into a document. Further, it is contemplated that the application being pasted into could be used to select, or provide a default selection, of the type of data to be pasted. Continuing with the example above, a user could simply select a remote paste command while in the contact manager application and the remotely copied contact card could be automatically selected and pasted into the application. Further, it may be advantageous to provide a security mechanism for controlling the copying of data from one electronic device to another. For example, it may be undesirable to allow sensitive work data to be copied to an unknown electronic device. Security information could be stored on the remote pasting electronic device and provided along with the remote paste request.

In some embodiments, any suitable computer readable media can be used for storing instructions for performing the methods described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method to provide object-mediated copy functionality at a first electronic device, the method comprising:
   receiving, through a user interface of the first electronic device, a data selection;
   receiving a remote copy command at the first electronic device;
   determining, at the first electronic device, a unique identifier of an object external to and proximate to the first electronic device;
   associating the data selection with the unique identifier of the object; and
   making the data selection associated with the unique identifier available to a second electronic device.

2. The method of claim 1, wherein the making the data selection associated with the unique identifier available comprises:
   storing the data selection with the unique identifier on the first electronic device; and
   communicating with the second electronic device to provide the copy data to the second electronic device.

3. The method of claim 2, wherein the communicating includes receiving a message having the unique identifier from the second electronic device.

4. The method of claim 2, wherein the communicating is performed through a wired or wireless connection with the second electronic device.

5. The method of claim 1, wherein the making the data selection associated with the unique identifier available comprises forwarding the data selection with the unique identifier from the first electronic device to a server.

6. The method of claim 1, wherein the making the data selection associated with the unique identifier available comprises:
 forwarding the unique identifier with an identifier of the first electronic device to a server;
 receiving, from the server, a paste request having the second device identifier and the unique identifier;
 communicating directly with the second electronic device based on the received paste request.

7. The method of claim 1, wherein the determining the unique identifier is performed over a short range communications interface between the first electronic device and the object.

8. A first electronic device configured to provide object mediated copy functionality, the first electronic device comprising:
 a processor; and
 a communications subsystem, wherein the first electronic device is configured to:
 receive, through a user interface of the first electronic device, a data selection;
 receive a remote copy command;
 determine a unique identifier of an object external to and proximate to the first electronic device;
 associate the data selection with the unique identifier of the object; and
 make the data selection associated with the unique identifier available to a second. electronic device.

9. The electronic device of claim 8, wherein the making the data selection associated with the unique identifier available comprises:
 storing the data selection with the unique identifier on the first electronic device; and
 communicating with the second electronic device to provide the copy data to the second electronic device.

10. The first electronic device of claim 9, wherein the communicating includes receiving a message having the unique identifier from the second electronic device.

11. The first electronic device of claim 9, wherein the communicating is performed through a wired or wireless connection with the second electronic device.

12. The first electronic device of claim 8, wherein the making the data selection associated with the unique identifier available comprises forwarding the data selection with the unique identifier from the first electronic device to a server.

13. The first electronic device of claim 8, wherein the making the data selection associated with the unique identifier available comprises:
 forwarding the unique identifier with an identifier of the first electronic device to a server;
 receiving, from the server, a paste request having the second device identifier and the unique identifier;
 communicating directly with the second electronic device based on the received paste request.

14. The first electronic device of claim 8, wherein the determining the unique identifier is performed over a short range communications interface between the first electronic device and the object.

15. A method to provide object-mediated copy functionality at a second electronic device, the method comprising:
 receiving a remote paste command at the second electronic device;
 determining, at the second electronic device, a unique identifier of an object external to and proximate to the second electronic device;
 locating copy data associated with the unique identifier; and
 receiving the copy data associated with the unique identifier.

16. The method of claim 15, wherein the locating the copy data comprises:
 communicating directly with a first electronic device to locate the copy data to the second electronic device.

17. The method of claim 16, wherein the communicating includes sending a message having the unique identifier from the second electronic device.

18. The method of claim 15, wherein the locating the copy data comprises requesting the copy data from a server using the unique identifier.

19. The method of claim 18, wherein the locating the copy data further comprises:
 receiving a connection establishment request from the first electronic device; and
 communicating directly with the first electronic device.

20. The method of claim 15, wherein the determining the unique identifier is performed over a short range communications interface between the second electronic device and the object.

* * * * *